Jan. 26, 1965  G. SLAYTER  3,167,427
POLYPHASE MATERIALS
Original Filed Dec. 27, 1955
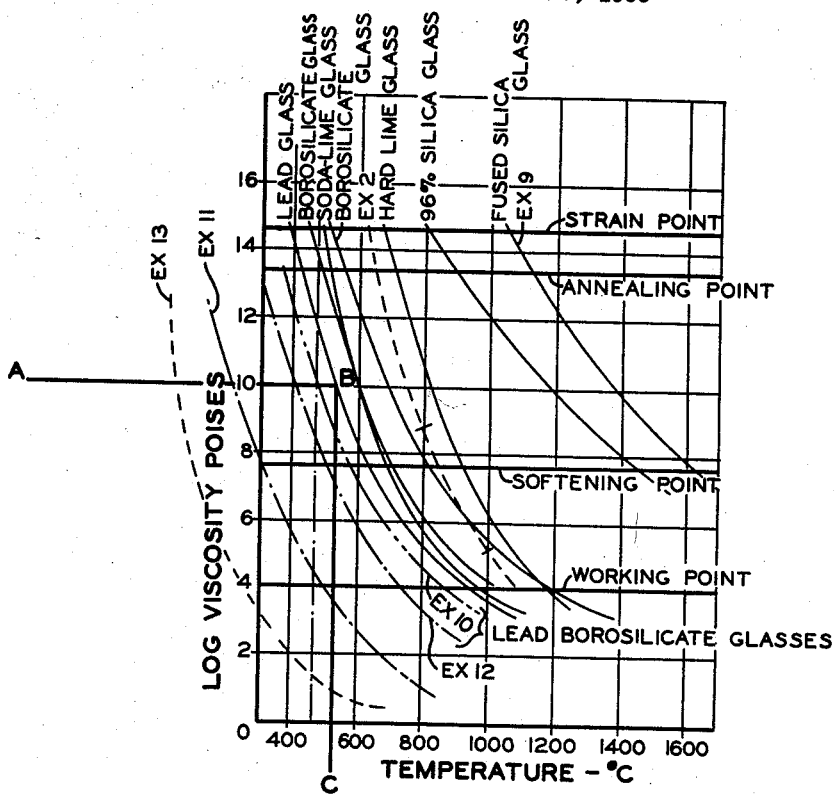
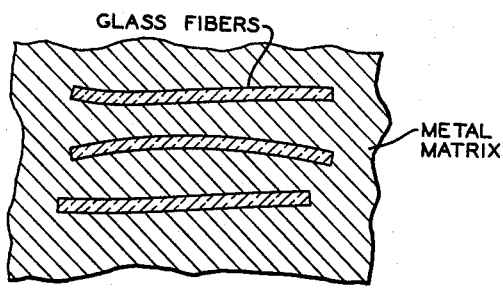
INVENTOR.
GAMES SLAYTER
BY
ATTORNEYS 3,167,427
POLYPHASE MATERIALS
Games Slayter, Newark, Ohio, assignor to Owens-Corning Fiberglas Corporation, a corporation of Delaware
Original application Dec. 27, 1955, Ser. No. 555,528, now Patent No. 3,047,383, dated July 31, 1962. Divided and this application Dec. 28, 1961, Ser. No. 162,745
7 Claims. (Cl. 75—201)

This invention relates to a new and improved structural material of high strength composed of two or more elements present in a diphase or polyphase system in which one of the phases exists in the structure in the form of fibers or other stretched or elongated substance. It relates more particularly to a composite structure of the type described and to a method for the manufacture of same wherein the fibrous phase is formed preferably of a glass while one of the other materials is a metal present in the form of fibers but preferably as a matrix or a continuous phase in which the fibers of glass are uniformly distributed for reinforcement and/or modification of the properties of the metal and in the manufacture of high strength structural materials and products.

This invention is a division of my copending application Ser. No. 555,528, filed December 27, 1955, now Patent No. 3,047,383, which was a continuation-in-part of my then copending application Serial No. 219,111, filed October 3, 1951, and entitled "Polyphase Materials," now abandoned.

In the aforementioned parent application, description is made of a heterogeneous system in which the fibrous phase is formed of a material such as glass, ceramic, refractory, metal, synthetic organic or synthetic organic-inorganic polymer and the like, and in which the other phase or phases in the form of a fibrous phase, matrix and the like is composed of a material such as glass, ceramic, refractory, metal, synthetic organic or inorganic resin and the like in which the aforementioned fibrous phase is preferably uniformly distributed and in which the phases are incapable of complete interdiffusion one with the other so as to maintain their separate identity in the structure. Obviously the system is capable of many ramifications such as glass fibers in a glass matrix, glass fibers in a ceramic matrix, glass in refractory, glass in metal, metal in glass, metal in ceramic, metal in refractory, metal in metal, resin in resin, and the like wherein the first component named comprises the fibrous phase in combination with the other component in the heterogeneous system.

The intent is to make use of a fibrous phase having higher strengths, elasticity, inertness, insulation characteristics or the like for modification of the characteristics of the other phase or phases in the manufacture of new and improved products, even when the fibrous phase is present in relatively small amounts as compared to the other phase or phases but in amounts sufficient to improve the tensile strength, flexure strength, impact strength, elongation, elasticity, creep or other mechanical and physical properties of the materials without materially affecting the other desirable properties thereof.

This invention is addressed to the system which makes use of a glass as the fibrous phase and a metal or metals as the other phase or phases which may be either in a fibrous form but preferably in the form of a matrix or substantially continuous phase in which the fibers of glass are uniformly distributed.

It is an object of this invention to produce and to provide a method for producing a composite structure of the type described having a fibrous phase formed essentially of a glass in combination with a phase or phases formed of a metal and it is a related object to produce a composite structure of the type described in which, in the glass and metal system, a relatively strong bonding relationship is developed at the interface between the metal and glass to maximize the physical and mechanical properties available from the glass inclusions in the composite structure that is formed.

These and other objects and advanatges of this invention will hereinafter appear and for purposes of illustration, but not of limitation, embodiments of the invention are illustrated in the accompanying drawing in which:

FIGURE 1 is a curve showing the viscosity characteristics of various glasses which may be used in the practice of this invention; and FIGURE 2 is an enlarged sectional elevational view through a section of a composite structure manufactured in accordance with the practice of this invention.

Many of the metals available commercially are limited in applications because of the inability of the particular metal to meet certain specifications for use, such as strength, creep and other mechanical or physical properties, or because the metal is incapable of being processed by method which would enable the particular metal to be competitive price-wise with other metals or materials which might be less desirable for the particular application from the standpoint of its physical and mechanical requirements.

It has been found in accordance with the practice of this invention that many such deficiencies or incapabilities of a metal can be overcome by the combination to include a fibrous phase of glass in the metal. It has been found further that a metal, satisfactory for many uses in its present form, can be so improved in its mechanical and physical properties by the practice of this invention to incorporate a fibrous phase of glass that it is capable of greatly expanded uses into applications and fields heretofore foreclosed to the metal and that products in which the new fibrous metal combination is employed are improved by comparison with the products formed of the metal alone.

For example, because of its low specific gravity, aluminum finds many applications in various fields. Nevertheless, there are many applications where it would be desirable to make use of aluminum but because of the low strength properties of aluminum, especially at elevated temperatures, it is necessary to sacrifice weight and make use of other materials of higher specific gravity than aluminum and which usually are also more expensive.

In this particular relationship, it has been found that the combination of glass fibers with aluminum is effective markedly to increase the strength properties of aluminum to the extent that the glass fiber reinforced aluminum products can be used effectively in applications in aircraft where materials of higher strengths were heretofore required.

In addition to the increase in the tensile strength and flexure strength properties of the material, the presence of glass fibers tends to stabilize the metal against creep and against deformation or change in shape during use.

These are but a few of the important contributions which the glass fibers make in systems of the type produced in accordance with the practice of this invention.

Further, because of the inertness and waterproofness of lead, use has been made of lead as a sheath for cables in the communications and electrical fields. Because of the high specific gravity of lead and because of its low tensile strength, it has been necessary to reinforce the lead with strands or wires of steel. These are expensive and subject to deterioration or attack with the result that the cost of the lead-sheathed cable is increased while its suitability for the application is of necessity decreased. In accordance with the practice of this invention, it has been found that glass fibers may be incorporated to increase the tensile strength properties of lead without increasing the cost of the finished product and while also increasing its inertness and resistance to attack by elements normally existing in the atmosphere or underground. A similar situation exists in the use of aluminum strands for electrical cables wherein a steel core has been required in the past to supply the additional strength necessary for support.

Using lead further as representative, in addition to its low tensile strength, lead is subject to creep which prevents its use where permanent shape or dimension constitute important specifications, even where its strength might be sufficient. For example, the use of lead as a lining for tanks and conduits in which corrosive materials are stored is faced by the problem of deformation of the lead under load. As a result, it has been necessary to "shore up" the lead walls to minimize deformation in use. The combination described and claimed herein of glass fibers with lead obviates the tendency for the lead to creep and at the same time the glass fibers increase the strength of the lead with the result that a lead base material of the type produced by this invention may be used for lining conduits and tubing without the additional supports heretofore required and with further improvements in the characteristics of the lining or insulation.

Aside from the physical and mechanical properties of metals previously considered, many metals are limited in their applications and use because of the inability to make use of efficient and economical methods for the fabrication of parts therefrom, as by means of extrusion and die-casting, to compete price-wise with products formed of other and possibly even less desirable metals. For example, many metals of low melting points and low viscosity in molten condition cannot be handled economically for fabrication into products by such low cost methods as extrusion, die-casting and the like. As a result, parts formed from such materials by other more expensive methods are not able to complete price-wise with products extruded or die-cast from other metals. Again, it has been found that the characteristics of such metals in fluid condition may be desirably improved by the practice of this invention by the inclusion of glass in fibrous form to broaden the processing characteristics of the metal while simultaneously introducing other improvements in mechanical and physical properties, as previously described.

In addition to the foregoing, the combination of glass fibers with a metal provides for further improvements in the characteristics of the metal, such as increased impact strength, increased resistance to corrosion and attack, reduced heat conductivity, improved electrical insulation properties and increased elasticity.

The concepts described and claimed in this application may be illustrated generally by FIGURE 2 of the drawing wherein 10 represents glass fibers uniformly distributed within a matrix 12 of a metal. It will be apparent that the structure illustrated is susceptible of a great many variations by way of the materials of which it is formed, and also from the standpoint of the procedure in fabrication of the structure.

For example, the matrix may be formed of any desirable metal capable of meeting the specifications which will hereinafter be described, such as aluminum, lead, copper, tin, zinc, cobalt, bismuth, titanium, iron, nickel, chromium, molybdenum, zirconium, magnesium, silver and the like, or alloy metals such as "woods metal," steels, brass, bronze and the like.

As used herein, the term "glass fibers" is intended to include fibers such as are formed by attenuation of molten streams of glass issuing in continuous streams from the underside of a glass melting furnace by impact with such materials as high velocity streams of air, steam or other gases issuing at high velocity into angular engagement with the streams of glass. Such fibers are generally referred to in the field as discontinuous or glass wool fibers. Included also are fibers such as are formed by the rapid attenuation of streams of molten glass issuing from the furnace by winding the fibers at high speed, as they are formed, about a spindle for rapid attenuation of the streams into fine filaments, generally referred to as continuous fibers. Included also are strands and yarns formed of such continuous or discontinuous fibers and fabrics formed therefrom. Other siliceous fibers such as rock wool fibers, slag wool fibers and asbestos fibers can be included but they are relatively weak by comparison with fibers formed of conventional glasses. Glass of various compositions can be used in the fabrication of fibers which may be employed in the practice of this invention. These range from the high softening point refractory fibers formed of substantially pure silica or quartz, through the fibers of intermediate softening point such as are formed of the sodium aluminum silicate glasses down to the low softening point glasses of lead borate and the like. The following are representative of the compositions of various types of glasses with their corresponding softening points and the viscosity characteristics of some are set forth in the curves of FIGURE 1 of the drawing.

*Example 1*

Low-alkali, lime-alumino borosilicate:

| | Percent by weight |
|---|---|
| $SiO_2$ | 54.5 |
| $Al_2O_3$ | 14.5 |
| CaO | 22.0 |
| $B_2O_3$ | 8.5 |
| $Na_2O$ | 0.5 |

Softening point 1526° F.

*Example 2*

Soda lime borosilicate:

| | |
|---|---|
| $SiO_2$ | 65.0 |
| $Al_2O_3$ | 4.0 |
| CaO | 14.0 |
| MgO | 3.0 |
| $B_2O_3$ | 5.5 |
| $Na_2O$ | 8.0 |
| $K_2O$ | 0.5 |

Softening point 1382° F.

*Example 3*

Soda lime borosilicate:

| | |
|---|---|
| $SiO_2$ | 59.0 |
| $Al_2O_3$ | 4.5 |
| CaO | 16.0 |
| MgO | 5.5 |
| $B_2O_3$ | 3.5 |
| $Na_2O$ | 11.0 |
| $K_2O$ | 0.5 |

Softening point 1319° F.

*Example 4*

Soda lime:

| | |
|---|---|
| $SiO_2$ | 73.0 |
| $Al_2O_3$ | 2.0 |
| CaO | 5.5 |
| MgO | 3.5 |
| $Na_2O$ | 16.0 |

Softening point 1310° F.

Example 5

Lime-free soda borosilicate: Percent by weight
- $SiO_2$ ----- 59.5
- $Al_2O_3$ ----- 5.0
- $B_2O_3$ ----- 7.0
- $Na_2O$ ----- 14.5
- $ZrO_2$ ----- 4.0
- $TiO_2$ ----- 8.0
- $F_2$ ----- 2.0

Softening point 1247° F.

Example 6

High lead silicate:
- $SiO_2$ ----- 34.0
- $Al_2O_3$ ----- 3.0
- $Na_2O$ ----- 0.5
- $K_2O$ ----- 3.5
- $PbO$ ----- 59.0

Softening point about 1110° F.

Example 7

Pyrex type:
- $SiO_2$ ----- 81.0
- $Al_2O_3$ ----- 2.0
- $B_2O_3$ ----- 12.0
- $Na_2O$ ----- 4.5

Softening point about 1526° F.

Example 8

Fiberfrax:
- $SiO_2$ ----- 45.77
- $Al_2O_3$ ----- 52.67
- $B_2O_3$ ----- 1.06
- $Na_2O$ ----- 0.5

Softening point over 2550° F.

Example 9

Silica glass:
- $SiO_2$ ----- 100.0

Softening point 3130° F.

Example 10

Lead borosilicate:
- $SiO_2$ ----- 24.6
- $CaO$ ----- 3.8
- $B_2O_3$ ----- 22.5
- $Na_2O$ ----- 10.0
- $CaF_2$ ----- 4.5
- $Na_3AlF_6$ ----- 9.1
- $PbO$ ----- 14.7

Example 11

$B_2O_3$ type glass:
- $B_2O_3$ ----- 60.0
- $CaO$ ----- 10.0
- $Na_2O$ ----- 20.0
- $SiO_2$ ----- 10.0

Example 12

Lead borosilicate:
- $SiO_2$ ----- 27.3
- $Al_2O_3$ ----- 8.7
- $CaO$ ----- 4.2
- $B_2O_3$ ----- 9.1
- $Na_2O$ ----- 13.0
- $ZnO$ ----- 11.4
- $BaO$ ----- 3.6
- $PbO$ ----- 17.6
- $F$ ----- 5.1

Example 13

Lead borate:
- $SiO_2$ ----- 5.0
- $B_2O_3$ ----- 10.0
- $PbO$ ----- 85.0

While it is possible in the specification of materials to select a suitable metal by reference to its melting point, it is not practical to ascribe a melting point to a glass composition since the glasses merely soften and become less viscous as the temperature is increased. Thus use is made of a point on the viscosity curve for the glass composition which is referred to as the softening point in the selection of particular glasses herein. By the term "softening point" as used herein and in the trade is meant the temperature at which a uniform fiber 0.5 to 1.0 mm. in diameter and 22.9 cm. in length elongates under its own weight at a rate of 1 mm. per minute when the upper 10 cm. of its length is heated in a prescribed furnace at the rate of approximately 5° C. per minute. For a glass having a density near 2.5, this temperature corresponds to a viscosity of $10^{7.6}$ poises. At temperatures above this, the softening increases and the glass becomes increasingly plastic—it being common to plastically work glass in a viscosity range of $10^{7.6}$ poises to $10^4$ or at even a more fluid condition. Slow plastic extension could be carried out at viscosities somewhat higher than the above arbitrarily defined softening point.

In the description which will hereinafter be made of the various concepts capable of being employed in the practice of this invention, the specification or characteristics required of the glass and the metal for use in combination will be set forth to enable selection of a glass composition having the desired characteristics for use with a particular metal in a particular system to be employed. Use can be made of the list of glasses previously set forth as a guide, or a glass composition capable of meeting the specifications for use in the preparation of glass fibers can be selected from the various treatises and tables available in the art. The properties of the many known metals and alloys are sufficiently clearly set forth in the various handbooks or tables to enable selection of a metal or metals meeting the defined specifications for use with the particular glass in the particular application.

The products illustrated generally in FIGURE 2 of the drawing are capable of being produced by the various techniques within the confines of this invention, which may be outlined broadly as follows:

(1) The desired metal or metal combination may be combined with the glass fibers for admixture therewith and forming into the desired end product by variations of powder metallurgy techniques to combine the glass and metal under heat and/or pressure into a composite structure, with or without the use of an additional binder metal.

Where the glass is introduced as fibers as an inclusion with the metal and where such fibrous state is maintained in the formation of the heterogeneous product, it is important to maintain a temperature condition which is below that sufficient to cause devitrification of the glass and, more important, the temperature should be maintained below the fusion temperature for the glass composition of which the fibers are formed. When it is desirable for the glass fibers to retain a great proportion of their strength properties, the glass fibers should not be exposed to a temperature above about 750° F. for any considerable time while the exposure time may be increased markedly at lower temperatures without materially affecting the desirable characteristics of the glass fibers. For example, with a lime, alumino, borosilicate glass of the type generally employed in the manufacture of glass fibers, exposure to temperatures within the range of 1000–1200° F. for a few seconds up to about 15–30 seconds is possible while exposures of several minutes up to a number of hours at temperatures below 750° F. can be made without serious effect on the strength properties of the glass.

Where, under the conditions of manufacture, the temperature conditions existing are below the softening temperature for the glass composition, the glass fibers can be incorporated directly as a fibrous phase for inclusion with the metal. When incorporated as a fibrous phase, the glass fibers may be selected of glass fibers previously formed, such as glass wool fibers, continuous filaments or strands of endless lengths preferably cut to shorter lengths, but it is preferred to make use of glass fibers fed directly from the fiber forming process or to make use of fibers which have been subjected previously to a heat treating process to take advantage of the improved bonding relationship which is available from the use of nascent glass fibers, as will hereinafter be pointed out.

One method wherein the glass may be included as previously formed fibers with the metal makes use of the concepts of powder metallurgy in which the metallic phase, representing the substantially continuous phase, has a sintering point temperature below the softening point temperature of the glass. While it is possible to make use of a system wherein the metallic phase constitutes the smaller proportion in the system but not less than 20 percent by weight, it is preferred to make use of a system wherein the metallic phase constitutes the major proportion of the final products such as more than 50 percent by weight. In the most desirable applications, use is made of glass fibers in amounts greater than 5 percent by weight up to 80 percent by weight of the final product. On the basis of parts by volume, the materials can be present in the ratio of 5–90 parts by volume glass to 95–10 parts by volume of metal.

In operation, the glass fibers are uniformly distributed by admixture with the metal, while the metal preferably is in the form of a powder. The desired amount of the mixture is then compressed in a mold to the desired form or shape and then heated to a temperature above the sintering temperature of the metal whereby the metal fuses or else functions as a binder to form a composite structure containing the glass fibers as an inclusion therein. Sintering, as the term is employed in the powder metallurgical field for heating sufficiently to cause bonding of the metal particles, may be carried out while the materials are still under compression or after the molded material has been removed from the mold for heat treatment separate and apart therefrom.

Under the conditions existing, the desirable properties of the glass fibers are not materially affected as by disintegration under pressure or by loss of strength, especially when the temperature conditions existing are substantially below the softening temperature for the particular glass of which the fibers are formed, as previously pointed out. If it should be desirable to make use of a temperature lower than the sintering or fusion temperature for the metallic component or if one wishes to make use of a metal having a sintering or fusion temperature which is above the softening point temperature for the glass composition, the powdered metal can be combined by admixture with the powder of another metal or alloy having a sintering or fusion temperature below the softening point temperature for the glass composition for bonding the materials to form a composite product upon compression and heating to the sintering or fusion temperature of the binder metal. The latter will usually be present in amounts greater than 5 percent by weight up to about 25 percent by weight of the metallic compounds, or about 2.5–25 percent by volume.

By way of example, aluminum, magnesium, wood's metal, lead, or zinc can be used alone or in combination with inclusions of glass fibers formed of a glass composition having a softening point of 700° F. to above 1500° F., such as glass compositions of Examples 1–13. The metal in powder form is mixed with glass preferably in amounts of about 50–90 parts by weight of the metal to 10–50 parts by weight of the glass fibers. The mixture is molded under pressure ranging from 100 to 10,000 pounds per square inch followed by heat treatment in a furnace to a temperature which may range from 450° F. up to 1250° F., depending upon the metallic component and the composition of the glass fibers.

It will be apparent that the combination may be made to include other metals with glass fibers and that the selection of the metal and glass may be based upon the specification which requires that the metal be capable of sintering to effect the desired bonding relationship at a temperature which is below and preferably substantially below the softening point temperature for the glass composition of which the fibers are formed. Thus a metal capable of being sintered at a temperature as high as 1800° F. may be employed in combination with a glass such as is formed of quartz and the like as long as the temperature employed is also incapable of causing devitrification of the glass whereby its desirable properties as a fiber are destroyed.

Dimensional stability, and fatigue strength are all substantially improved, especially upon exposure of the particular metal to elevated temperatures. It appears that these improvements might result from the ability of the glass inclusions to limit the elasticity and plasticity of the metal. Aluminum admixed with glass fibers in accordance with the practice of this invention is substantially increased in its strength properties and creep, especially at temperatures in the range of 600–1000° F. Similar increases in the described combination of glass inclusions are secured with lead and with zinc.

Products produced in accordance with the practice of this invention may show greatly improved resistance to corrosion, particularly at elevated temperatures. Expensive metals can, in a sense, be diluted with the glass to decrease the cost of the product without affecting the desirable properties of the metal.

It will be apparent from the foregoing that there is provided a new and improved method for forming inclusions of glass fibers into metal desirably to improve the mechanical and physical properties of the metal in applications in which the metal has been employed and further to improve the physical and mechanical properties of the metal whereby the metal becomes available for use in fields heretofore occupied by other materials.

In the preceding, relative amounts of fiber and metal included in the masses produced have been given in terms of parts or percentages by weight. It will be realized that as the glasses generally are of about a 2.5 specific gravity and that the metals are both lower and much higher than this in specific gravity that the weight percentage figures thus represent a wide range in relative volumes of the two phases. A mix of lead including 60 percent by weight of glass fibers would have therein 90 percent by volume of the glass phase. When calculated on a volumetric basis, it is possible depending upon the degrees of alignment of the fibrous phase, to include a fibrous glass phase of 75 to 90 percent by volume or only 25 to 10 percent by volume of metal. This maximum possible volume of dispersed or included fibrous glass will also vary as the fibrous glass is of a single diameter or of some multiple distribution of diameters. Thus the invention includes the making of products where the glass may be of up to 90 percent by volume as a maximum and down to 5 percent by volume as a minimum in combination with a metal or metals or metallic compounds as the remainder to produce products of improved strength and utility. It will be understood that the volumetric ratios may be calculated by conversion with the specific gravities of the metals, using 2.5 as the specific gravity for the glass components.

It will be understood that changes may be made in the details of formulation and operation, without departing from the spirit of the invention, especially as defined in the following claims.

I claim:

1. A method for producing a product formed of a substantially continuous phase of metal and a discontinuous phase of glass fibers uniformly distributed throughout the substantially continuous phase of metal, in which the metal phase is formed of one metal having a sintering temperature higher than the softening point temperature for the glass composition of which the glass fibers are formed and another metal in combination having a sintering temperature below the softening point temperature for the glass composition of which the glass fibers are formed, comprising the steps of mixing the glass fibers with the metals while the latter are in a finely divided form, and in amounts wherein the metal component comprises 20–95 percent by weight of the mixture and wherein the other metal comprises 5–25 percent by weight of the metallic system, compressing the mixture of metal particles and glass fibers, and heating the compressed mass to a temperature above the sintering temperature for the metal having the lower sintering temperature but below the softening point temperature of the glass composition of which the glass fibers are formed to form the metal into a substantially continuous phase having the glass fibers uniformly distributed therein as a discontinuous phase.

2. A method for producing a product formed of a substantially continuous phase of metal and a discontinuous phase of glass fibers uniformly distributed throughout the substantially continuous phase of metal in the ratio of 5–90 percent by volume of glass to 95–10 percent by volume of metal, in which the metal phase is formed of one metal having a sintering temperature higher than the softening point temperature for the glass composition of which the glass fibers are formed and another metal in combination having a sintering temperature below the softening point temperature for the glass composition of which the glass fibers are formed and in which the other metal is present in an amount ranging from 5 to 25 percent by volume of the total of the metals in the metal phase, comprising the steps of mixing the glass fibers with the metals while the latter are in a finely divided form, compressing the mixture of metal particles and glass fibers, and heating the compressed mass to a temperature above the sintering temperature for the metal having the lower sintering temperature but below the softening point temperature of the glass composition of which the glass fibers are formed to form the metal into a substantially continuous phase having the glass fibers uniformly distributed therein as a discontinuous phase.

3. A method for producing a product formed of a substantially continuous phase of metal and a discontinuous phase of glass fibers uniformly distributed throughout the substantially continuous phase of metal in the ratio of 5–90 percent by volume of glass to 95–10 percent by volume of metal, in which the metal phase is formed of one metal having a sintering temperature higher than the softening point temperature for the glass composition of which the glass fibers are formed and another metal in combination having a sintering temperature below the softening point temperature for the glass composition of which the glass fibers are formed, and in which the other metal is present in an amount within the range of 2.5 to 25 percent by volume of the metallic phase, comprising the steps of mixing the glass fibers with the metals while the latter are in a finely divided form, compressing the mixture of metal particles and glass fibers, and heating the compressed mass to a temperature above the sintering temperature for the metal having the lower sintering temperature but below the softening point temperature of the glass composition of which the glass fibers are formed to form the metal into a substantially continuous phase having the glass fibers uniformly distributed therein as a discontinuous phase.

4. A method for producing a product formed of a substantially continuous phase of metal and a discontinuous phase of glass fibers uniformly distributed throughout the substantially continuous phase of metal, in which the metal phase is formed of one metal having a sintering temperature higher than the softening point temperature for the glass composition of which the glass fibers are formed and another metal in combination having a sintering temperature below the softening point temperature for the glass composition of which the glass fibers are formed and in which the metallic phase comprises 20–95 percent by weight of the mixture and in which the other metal comprises 5–25 percent by weight of the metallic system, comprising the steps of mixing the glass fibers with the metals while the latter are in a finely divided form, compressing the mixture of metal particles and glass fibers, and heating the compressed mass to a temperature above the sintering temperature for the metal having the lower sintering temperature but below the softening point temperature of the glass composition of which the glass fibers are formed to form the metal into a substantially continuous phase having the glass fibers uniformly distributed therein as a discontinuous phase.

5. A method for producing a product formed of a substantially continuous phase of metal and a discontinuous phase of glass fibers uniformly distributed throughout the substantially continuous phase of metal, in which the metal phase is formed of one metal having a sintering temperature higher than the softening point temperature for the glass composition of which the glass fibers are formed and another metal in combination having a sintering temperature below the softening point temperature for the glass composition of which the glass fibers are formed and in which the metallic phase comprises 20–95 percent by weight of the mixture and in which the other metal comprises 5–25 percent by weight of the metallic system, comprising the steps of mixing the glass fibers with the metals while the latter are in a finely divided form, compressing the mixture of metal particles and glass fibers, and heating the compressed mass to a temperature above the sintering temperature for the metal having the lower sintering temperature but below the softening point temperature of the glass composition of which the glass fibers are formed to form the metal into a substantially continuous phase having the glass fibers uniformly distributed therein as a discontinuous phase.

6. A method for producing a product formed of a substantially continuous phase of metal and a discontinuous phase of glass fibers uniformly distributed throughout the substantially continuous phase of metal, in which the metal phase is formed of one metal having a sintering temperature higher than the softening point temperature for the glass composition of which the glass fibers are formed and another metal in combination having a sintering temperature below the softening point temperature for the glass composition of which the glass fibers are formed and in which the glass fiber component is present in an amount greater than 50 percent but less than 95 percent by volume of the metallic phase, and in which the other metal makes up 5–25 percent by weight of the metallic system, comprising the steps of mixing the glass fibers with the metals while the latter are in a finely divided form, compressing the mixture of metal particles and glass fibers, and heating the compressed mass to a temperature above the sintering temperature for the metal having the lower sintering temperature but below the softening point temperature of the glass composition of which the glass fibers are formed to form the metal into a substantially continuous phase having the glass fibers uniformly distributed therein as a discontinuous phase.

7. A method for producing a product formed of a substantially continuous phase of metal and a discontinuous phase of glass fibers uniformly distributed throughout the substantially continuous phase of metal, in which the metal phase is formed of one metal having a sintering temperature higher than the softening point temperature for the glass composition of which the glass fibers are formed and another metal in combination having a sintering temperature below the softening point temperature for the glass composition of which the glass fibers are formed, comprising the steps of mixing the glass fibers with the metals while the latter are in a finely divided form, compressing and forming the mixture of metal particles and glass fibers to a desired final shape, and heating the compressed mass to a temperature above the sintering temperature for the metal having the lower sintering temperature but below the softening point temperature of the glass composition of which the glass fibers are formed to form the metal into a substantially continuous phase having the glass fibers uniformly distributed therein as a discontinuous phase.

References Cited in the file of this patent

UNITED STATES PATENTS

| | | |
|---|---|---|
| 2,415,036 | Quinn | Oct. 13, 1944 |
| 2,559,572 | Stalego | July 3, 1951 |
| 3,045,332 | Denison | July 24, 1962 |
| 3,047,409 | Slayter | July 31, 1962 |

FOREIGN PATENTS

| | | |
|---|---|---|
| 715,528 | Great Britain | Sept. 15, 1954 |